US012716370B1

(12) United States Patent
Heeter et al.

(10) Patent No.: US 12,716,370 B1
(45) Date of Patent: Aug. 25, 2026

(54) TIP INJECTION SYSTEM FOR GAS TURBINE ENGINES WITH PHASE CHANGE MATERIAL COOLING FOR THERMAL DISTORTION MITIGATION

(71) Applicant: Rolls-Royce North American Technologies Inc., Indianapolis, IN (US)

(72) Inventors: Robert W. Heeter, Indianapolis, IN (US); Daniel E. Molnar, Jr., Indianapolis, IN (US); Ryan A. Trent, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 19/346,313

(22) Filed: Sep. 30, 2025

(51) Int. Cl.
*F01D 25/24* (2006.01)
*F01D 25/12* (2006.01)

(52) U.S. Cl.
CPC ............. *F01D 25/24* (2013.01); *F01D 25/12* (2013.01); *F05D 2220/36* (2013.01); *F05D 2260/20* (2013.01)

(58) Field of Classification Search
CPC .......... F01D 25/12; F01D 25/14; F01D 25/24; F05D 2220/36; F05D 2260/20
USPC .......................................................... 415/177
See application file for complete search history.

(56) References Cited

U.S. PATENT DOCUMENTS

| | | | |
|---|---|---|---|
| 1,036,522 | A | 8/1912 | Johnson |
| 4,674,704 | A | 6/1987 | Altoz et al. |
| 5,308,225 | A | 5/1994 | Koff et al. |
| 5,474,417 | A | 12/1995 | Privett et al. |
| 6,037,032 | A | 3/2000 | Klett et al. |
| 6,239,502 | B1 | 5/2001 | Grewe et al. |
| 6,780,505 | B1 | 8/2004 | Klett et al. |
| 7,077,623 | B2 | 7/2006 | Guemmer |
| 7,859,845 | B2 | 12/2010 | Ullman et al. |
| 7,870,721 | B2 | 1/2011 | Winter et al. |
| 7,967,556 | B2 | 6/2011 | Gmmer |
| 8,043,046 | B2 | 10/2011 | Guemmer |
| 8,152,444 | B2 | 4/2012 | Guemmer |
| 8,152,445 | B2 | 4/2012 | Guemmer |
| 8,152,467 | B2 | 4/2012 | Guemmer |
| 8,182,209 | B2 | 5/2012 | Brault et al. |
| 8,192,148 | B2 | 6/2012 | Guemmer |
| 8,262,340 | B2 | 9/2012 | Guemmer |

(Continued)

*Primary Examiner* — Nathaniel E Wiehe
*Assistant Examiner* — Justin A Pruitt
(74) *Attorney, Agent, or Firm* — Barnes & Thornburg

(57) ABSTRACT

A fan case assembly comprises a fan track liner, an annular case, and a tip injection system. The fan track liner includes a forward end, an aft end axially aft of the forward end, and an inner radial surface that extends between the forward and aft ends to define a gas path. The tip injection system includes an air recirculation duct configured to direct a portion of gases flowing through the gas path from the aft end of the fan track liner into the gas path adjacent the forward end of the fan track liner and a thermal conditioner in thermal communication with the air recirculation duct. The thermal conditioner includes phase change material configured to extract heat from the portion of gases flowing through the air recirculation duct to cool the portion of gases and minimize thermal distortion induced by the portion of gases.

20 Claims, 6 Drawing Sheets

(56) References Cited

U.S. PATENT DOCUMENTS

| | | | | |
|---|---|---|---|---|
| 8,403,630 | B2 | 3/2013 | Guemmer | |
| 8,683,811 | B2 * | 4/2014 | Clemen | F04D 29/681 60/785 |
| 9,036,352 | B2 | 5/2015 | Engelhardt et al. | |
| 9,534,537 | B2 | 1/2017 | Gagne et al. | |
| 10,415,474 | B2 | 9/2019 | Riaz et al. | |
| 10,436,522 | B2 | 10/2019 | Altman et al. | |
| 10,485,138 | B2 | 11/2019 | Engelhardt et al. | |
| 10,627,167 | B2 * | 4/2020 | Sampath | F02C 7/185 |
| 11,193,720 | B2 | 12/2021 | Sampath et al. | |
| 11,702,945 | B2 | 7/2023 | Heeter et al. | |
| 11,732,612 | B2 * | 8/2023 | Molnar, Jr. | F01D 25/26 415/116 |
| 11,946,379 | B2 * | 4/2024 | Heeter | F04D 19/02 |
| 12,095,125 | B2 | 9/2024 | Holland | |
| 12,168,983 | B1 | 12/2024 | Heeter et al. | |
| 12,181,225 | B2 | 12/2024 | Quinn et al. | |
| 12,286,930 | B1 | 4/2025 | Heeter et al. | |
| 12,292,000 | B1 | 5/2025 | Johnson et al. | |
| 2002/0033247 | A1 | 3/2002 | Neuschutz et al. | |
| 2020/0256253 | A1 | 8/2020 | Sawyers-Abbott et al. | |

* cited by examiner

TIP INJECTION SYSTEM FOR GAS TURBINE ENGINES WITH PHASE CHANGE MATERIAL COOLING FOR THERMAL DISTORTION MITIGATION

FIELD OF THE DISCLOSURE

The present disclosure relates generally to gas turbine engines, and more specifically to tip injection systems for gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications. Gas turbine engines also typically include a fan assembly that includes rotating blades that force air into the compressor of the engine, as well as potentially providing additional thrust via forcing air around the engine core through bypass ducts.

The engine inlet may experience high distortion in the form of pressure gradients and swirl. The pressure and swirl distortions may cause engine stall or other undesirable aeromechanical behavior. The fan assembly of the gas turbine engine may include mitigation systems to reduce or minimize the negative effects of pressure and swirl distortions to improve stall margin of the engine. However, such mitigation systems may not account for thermal distortion.

SUMMARY

The present disclosure may comprise one or more of the following features and combinations thereof.

A fan case assembly adapted for use with a gas turbine engine may include a fan track liner, an annular case, and a tip injection system. The fan track liner may extend circumferentially at least partway about a central axis of the gas turbine engine. The fan track liner may include a forward end, an aft end spaced apart axially from the forward end, and an inner radial surface that extends between the forward end and the aft end to define a gas path of the gas turbine engine. The annular case may be configured to support the fan track liner at a radial position relative to the central axis. The annular case may include an outer wall that extends circumferentially around the central axis of the gas turbine engine. The tip injection system may include an air recirculation duct and a thermal conditioner. The air recirculation duct may be configured to direct a portion of gases flowing through the gas path of the gas turbine engine from the aft end of the fan track liner into the gas path at the forward end of the fan track liner. The air recirculation duct may have (i) an extraction port in fluid communication with the gas path at a location axially aft of the aft end of the fan track liner, (ii) a conduit that extends axially forward from the extraction port toward the forward end of the fan track liner, and (iii) an injection port that extends radially inward from the conduit at a location adjacent the forward end of the fan track liner. The thermal conditioner may be in thermal communication with the conduit of the air recirculation duct. The thermal conditioner may include phase change material configured to extract heat from the portion of gases flowing through the conduit to change a state of the phase change material from a first state to a second state different than the first state and thereby cool the portion of gases and minimize thermal distortion induced by the portion of gases at the location adjacent the forward end of the fan track liner.

In some embodiments, the thermal conditioner may further include a reservoir arranged around the conduit of the air recirculation duct and the phase change material may be located in the reservoir. At least a portion of the conduit of the air recirculation duct may comprise pitch-based carbon fiber material. A radial outer wall of the reservoir that faces away from the conduit may comprise polyacrylonitrile (PAN)-based carbon fiber materials.

In some embodiments, the annular case may further include a hook that extends radially inward from the outer wall to support the forward end of the fan track liner. The extraction port may extend radially through the outer wall at the location axially aft of the aft end of the fan track liner and the injection port may extend radially inward from the conduit through the outer wall at a location axially forward of the forward end of the fan track liner and the hook of the annular case.

In some embodiments, the conduit and the phase change material may be located radially outward of the outer wall. The conduit and the phase change material may be located radially inward of the outer wall. The tip injection system may further include a valve coupled to the extraction port of the air recirculation duct and configured to vary a flow of the portion of gases through the extraction port and into the conduit. The valve may be configured to change between a closed position in which the valve blocks an opening of the extraction port to prevent the flow of the portion of gases through the extraction port and an open position in which the valve opens the opening of the extraction port to direct the portion of gases flowing through the gas path into the extraction port.

In some embodiments, the tip injection system may further comprise a controller in communication with the valve and configured to change the valve between the closed position and the open position.

According to another aspect of the present disclosure, a fan case assembly adapted for use with a gas turbine engine may include a fan track liner, an annular case, and a tip injection system. The fan track liner may extend circumferentially at least partway about a central axis of the gas turbine engine. The fan track liner may include a forward end, an aft end spaced apart axially from the forward end, and an inner radial surface that extends between the forward end and the aft end to define a gas path of the gas turbine engine. The annular case may be configured to support the fan track liner at a radial position relative to the central axis. The tip injection system may include an air recirculation duct that directs a portion of gases flowing through the gas path of the gas turbine engine from the aft end of the fan track liner into the gas path adjacent the forward end of the fan track liner and a thermal conditioner in thermal communication with the air recirculation duct. The thermal conditioner may include phase change material configured to extract heat from the portion of gases flowing through the air recirculation duct to change a state of the phase change material from a first state to a second state different than the first state and thereby cool the portion of gases.

In some embodiments, the air recirculation duct may include an extraction port in fluid communication with the gas path at a location axially aft of the aft end of the fan track liner, a conduit that extends axially forward from the extraction port toward the forward end of the fan track liner, and an injection port that extends radially inward from the conduit at a location axially forward of the forward end of the fan track liner. The thermal conditioner may further include a reservoir arranged around the conduit of the air recirculation duct and the phase change material may be located in the reservoir.

In some embodiments, at least a portion of the conduit of the air recirculation duct may comprise pitch-based carbon fiber materials. A radial outer wall of the reservoir that faces away from the conduit may comprise polyacrylonitrile (PAN)-based carbon fiber materials.

In some embodiments, the annular case may include an outer wall that extends circumferentially around the central axis of the gas turbine engine. The phase change material may be located radially outward of the outer wall.

In some embodiments, the annular case may include an outer wall that extends circumferentially around the central axis of the gas turbine engine. The phase change material may be located radially inward of the outer wall.

In some embodiments, the tip injection system may further include a valve coupled to the air recirculation duct and configured to vary a flow of the portion of gases through the air recirculation duct. The tip injection system may further comprise a controller in communication with the valve and configured to change the valve between a closed position in which the valve blocks an opening of the air recirculation duct to prevent a flow of the portion of gases through the air recirculation duct and an open position in which the valve opens the opening of the air recirculation duct to direct the portion of gases flowing through the gas path into the air recirculation duct.

A method may include providing an annular case that extends around a central axis, a fan track liner that extends circumferentially at least partway around the central axis, and a tip injection system including an air recirculation duct and a thermal conditioner. The method may include coupling the fan track liner to the annular case. The method may include directing a portion of gases from an aft end of the fan track liner radially outwardly and axially forward into a conduit of the air recirculation duct. The method may include extracting heat from the portion of gases flowing through the conduit via phase change material of the thermal conditioner thereby cooling the portion of gases. The method may include directing the portion of gases radially inwardly from the conduit at a forward end of the fan track liner.

In some embodiments, the annular case may include an outer wall. The conduit and the phase change material may be located radially outward of the outer wall. The method may further comprise, before the step of directing a portion of gases from an aft end of the fan track liner radially outwardly and axially forward into a conduit, moving a valve from a closed position to an open position to open the air recirculation duct such that the portion of gases is free to flow into the air recirculation duct.

These and other features of the present disclosure will become more apparent from the following description of the illustrative embodiments.

DETAILED DESCRIPTION OF THE DRAWINGS

Figure 1:
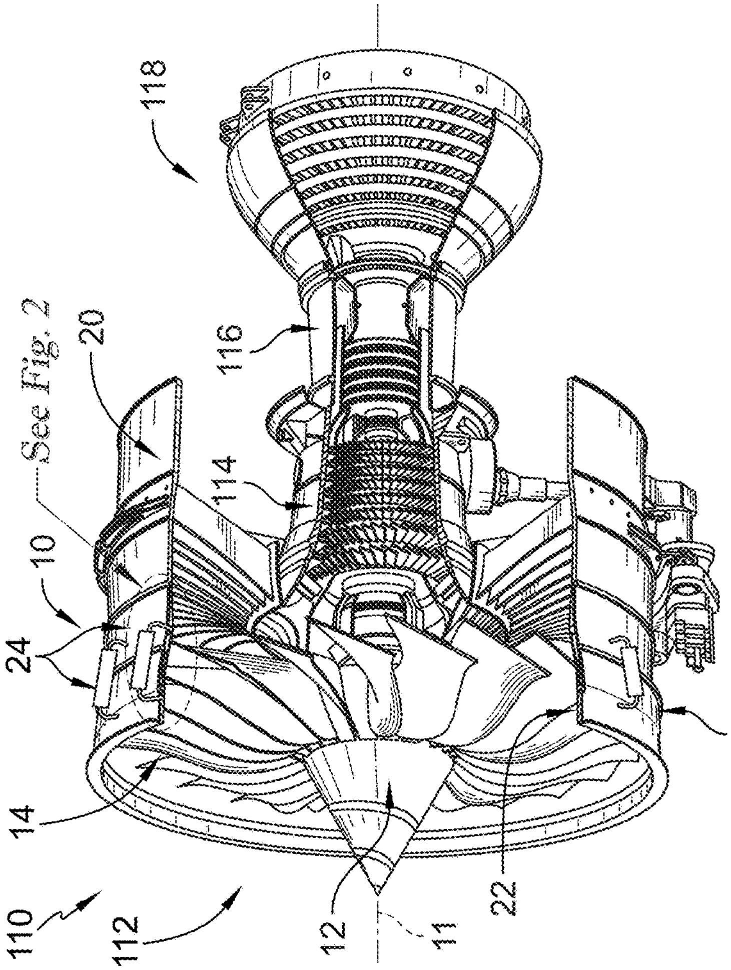
FIG. 1 is a cutaway view of a gas turbine engine that includes a fan, a compressor, a combustor, and a turbine, the fan including a fan rotor configured to rotate about an axis of the engine and a fan case assembly that surrounds fan blades included in the fan rotor, and further showing that the fan case assembly includes an annular case, a fan track liner positioned around the fan blades, and a tip injection system extending radially outward of the annular case.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110, as shown in FIG. 1. The gas turbine engine 110 includes a fan 112, a compressor 114, a combustor 116, and a turbine 118, as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high-pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and the fan case assembly 10, as shown in FIG. 1. The fan rotor 12 has a plurality of fan blades 14. The fan case assembly 10 extends circumferentially around the plurality of fan blades 14 of the fan rotor 12 such that the fan case assembly 10 is aligned axially with the plurality of fan blades 14.

The fan case assembly 10 includes, among other components, an annular case 20, a fan track liner 22, and a tip injection system 24, as shown in FIGS. 1-4. The annular case 20 is configured to support the fan track liner 22 at a radial position relative to the axis 11 of the gas turbine engine 110. The fan track liner 22 extends circumferentially at least partway about the axis 11 of the gas turbine engine 110 and defines a portion of a gas path 18 of the gas turbine engine 110. The tip injection system 24 is configured to direct a portion of gases flowing through the gas path 18 of the gas turbine engine 110 from an aft end 32 of the fan track liner 22 into the gas path 18 axially forward of a forward end 30 of the fan track liner 22. The tip injection system 24 is also configured to extract heat from the portion of gases before the portion of gases is injected into the gas path 18 axially forward of the forward end 30 of the fan track liner 22.

Figure 2:
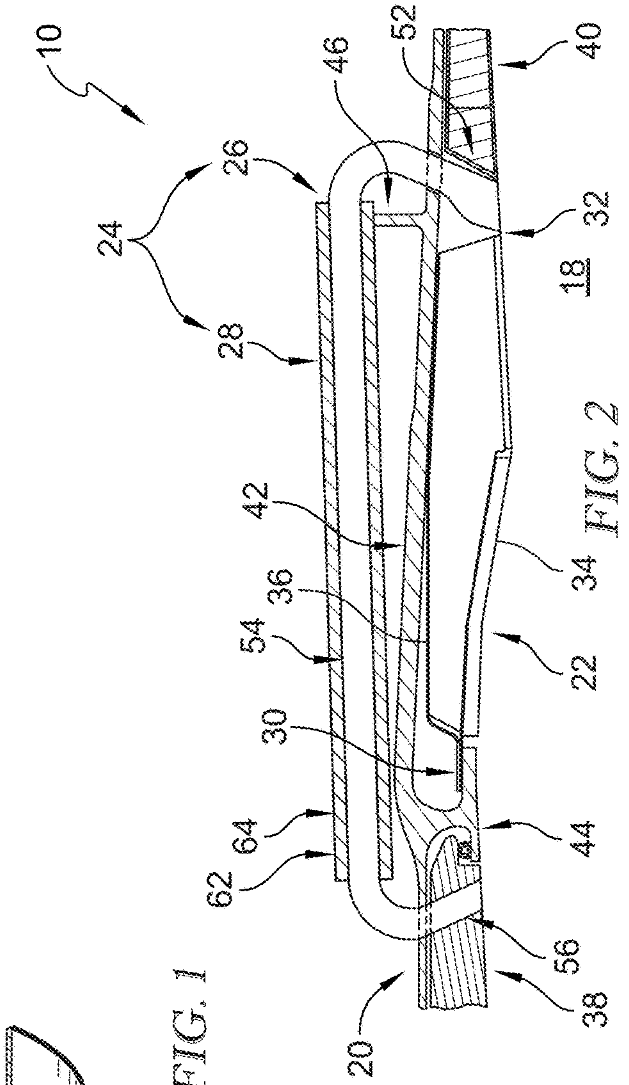
FIG. 2 is an enlarged section view of the fan case assembly of FIG. 1 showing the tip injection system includes an air recirculation duct configured to direct a portion of gases flowing through a gas path of the gas turbine engine from an aft end of the fan track liner into the gas path axially forward of a forward end of the fan track liner and a thermal conditioner extending around the air recirculation duct and configured to extract heat from the portion of gases flowing through the air recirculation duct.
Figure 3:
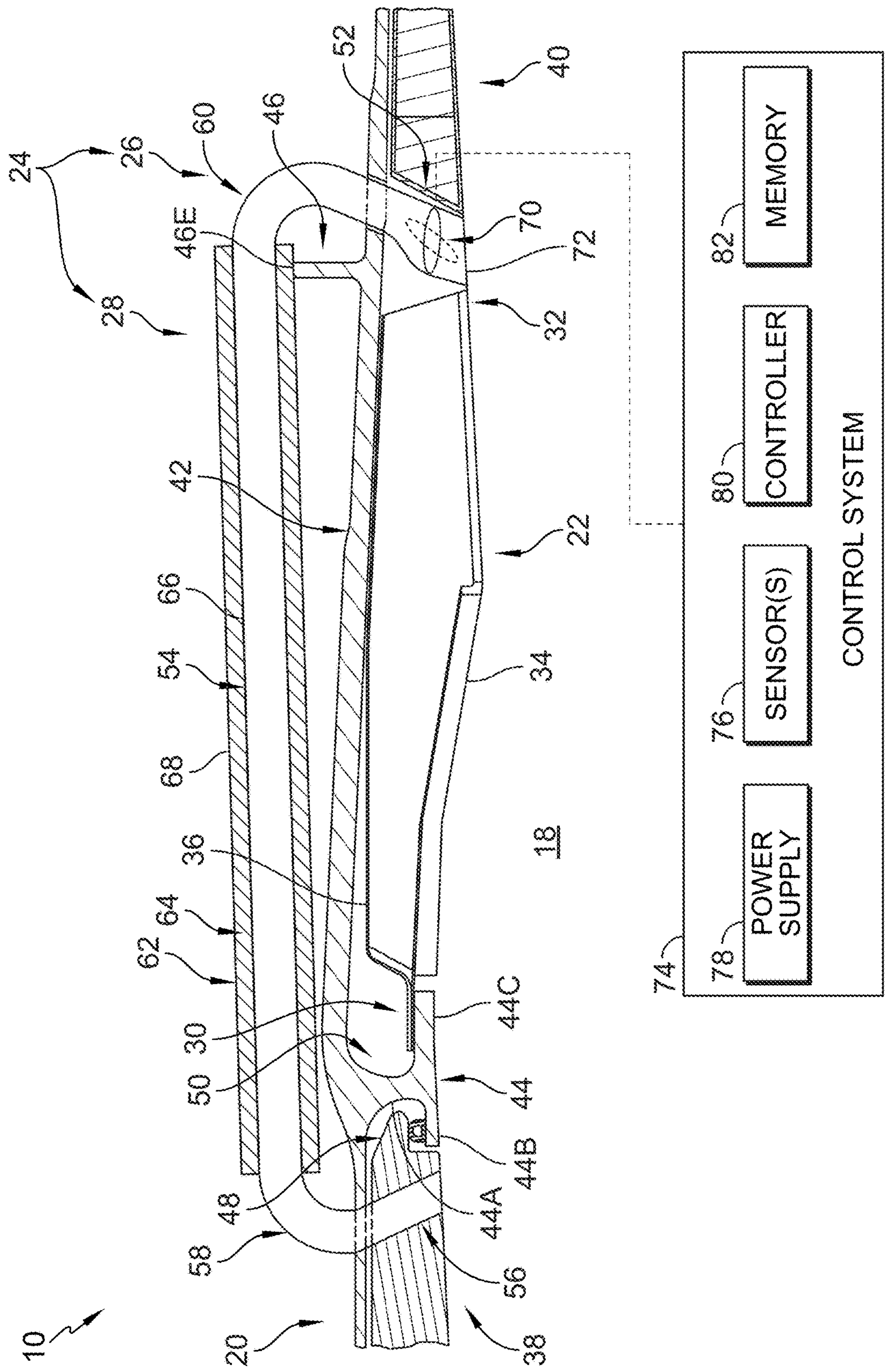
FIG. 3 is an enlarged view of FIG. 2 showing the air recirculation duct includes an extraction port in fluid communication with the gas path that extends radially through an outer wall of the annular case at a location axially aft of the aft end of the fan track liner, an injection port in fluid communication with the gas path that extends radially through the outer wall at a location axially forward of the forward end of the fan track liner, and a conduit that extends between and interconnects the extraction port and the injection port, and further showing the conduit extends through the thermal conditioner.

The tip injection system 24 includes an air recirculation duct 26 and a thermal conditioner 28, as shown in FIGS. 2 and 3. The air recirculation duct 26 is configured to direct the portion of gases flowing through the gas path 18 from the aft end 32 of the fan track liner 22 into the gas path 18 axially forward of the forward end 30 of the fan track liner 22. The thermal conditioner 28 is in thermal communication with the air recirculation duct 26 to extract the heat from the portion of gases flowing through the air recirculation duct 26.

The gas turbine engine 110 may experience high distortion in the form of pressure gradients and swirl. The pressure and swirl distortions may cause engine stall or other undesirable aeromechanical behavior. In this way, the tip injection system 24 includes the air recirculation duct 26 to reduce or minimize the negative effects of pressure and swirl distortions to improve stall margin of the gas turbine engine 110.

However, the air recirculation duct 26 may not account for thermal distortion that may be induced in response to the portion of gases being injected into the gas path 18. For example, because the portion of gases is extracted from the gas path 18 at the aft end 32 of the fan track liner 22, the portion of gases is relatively hotter than the gases in the gas path 18 at the forward end 30 of the fan track liner 22. Thus, the portion of gases being injected into the gas path 18 may induce thermal distortion at the forward end 30 of the fan track liner 22. Injection of relatively hotter gases at the forward end 30 of the fan track liner 22 may result in the engine being less efficient and/or may result in lowered margins for certain material systems downstream of the fan 112 (i.e., the fan track liner 22, outlet guide vanes, etc.). The tip injection system 24 of the present disclosure includes the thermal conditioner 28 to extract the heat from the portion of gases flowing through the air recirculation duct 26 before the portion of gases is injected into the gas path 18. The thermal conditioner 28 minimizes thermal distortion that may result from relatively hotter gases being injected into the gas path 18 at the forward end 30 of the fan track liner 22.

Turning again to the fan track liner 22, the fan track liner 22 is formed by a number of liner segments 22 in the illustrative embodiment. Each liner segment 22 includes the forward end 30, the aft end 32 spaced apart axially from the forward end 30, and inner and outer radial surfaces 34, 36, as shown in FIGS. 2 and 3. The inner and outer radial surfaces 34, 36 extend between the forward end 30 and the aft end 32. The inner radial surface 34 defines a portion of the gas path 18 of the gas turbine engine 110.

The fan case assembly 10 further includes acoustic panels 38, 40, as shown in FIGS. 2 and 3. The acoustic panels 38, 40 define portions of the gas path 18 axially forward and aft of the fan track liner 22. The forward acoustic panel 38 is located forward of the fan track liner 22, and the aft acoustic panel 40 is located aft of the fan track liner 22. The liner segments 22 and the acoustic panels 38, 40 are coupled to the annular case 20, as shown in FIG. 3.

The annular case 20 includes an outer wall 42, a hook 44, and a flange 46, as shown in FIGS. 2 and 3. The outer wall 42 extends circumferentially around the axis 11 of the gas turbine engine 110. The hook 44 extends radially inward from the outer wall 42 to support the forward end 30 of the fan track liner 22. The flange 46 extends radially outward from the outer wall 42 axially aft of the hook 44. In some embodiments, the fan track liner 22 is coupled to the outer wall 42 near the aft end 32 of the fan track liner 22 with a fastener to support the aft end 32 of the fan track liner 22. In other embodiments, the fan track liner 22 may be bolted to the annular case 20 without the hook 44. In other embodiments, the fan track liner 22 may be coupled to the annular case 20 with adhesive.

The hook 44 includes a radially-extending portion 44A, a forward flange 44B, and an aft flange 44C, as shown in FIG. 3. The radially-extending portion 44A extends radially inward form the outer wall 42. The forward flange 44B extends axially forward away from the radially-extending portion 44A at a location radially spaced apart from the outer wall 42 to form a first axially opening channel 48, as shown in FIG. 3. The aft flange 44C extends axially aft away from the radially-extending portion 44A at a location radially spaced apart from the outer wall 42 to form a second axially opening channel 50, as shown in FIG. 3.

The forward flange 44B engages the forward acoustic panel 38 to support the forward acoustic panel 38, while the aft flange 44C engages the fan track liner 22 to support the fan track liner 22, as shown in FIG. 3. The acoustic panel 38 extends into the first axially opening channel 48. The forward end 30 of the fan track liner 22 extends into the second axially opening channel 50.

The air recirculation duct 26 of the tip injection system 24 includes an extraction port 52, a conduit 54, and an injection port 56, as shown in FIGS. 2 and 3. In some embodiments, the ports 52, 56 and the conduit 54 are integrally formed as a single, one-piece component. In other embodiments, the ports 52, 56 and the conduit 54 are individual or even several components each that are coupled together. Both the extraction port 52 and the injection port 56 are in fluid communication with the gas path 18 of the gas turbine engine 110, while the conduit 54 is in fluid communication with the extraction and injection ports 52, 56.

The extraction port 52 extends radially through the outer wall 42 of the annular case 20 at a location axially aft of the aft end 32 of the fan track liner 22, as shown in FIG. 3. The conduit 54 extends axially forward from the extraction port 52 toward the forward end 30 of the fan track liner 22 to the injection port 56. The injection port 56 extends radially inward from the conduit 54 through the outer wall 42 of the annular case 20 at a location axially forward of the forward end 30 of the fan track liner 22.

The conduit 54 is located radially outward of the outer wall 42 of the annular case 20, as shown in FIGS. 1-4. The extraction port 52 and the injection port 56 extend radially inward through the outer wall 42 of the annular case 20 and open into the gas path 18. In this way, the portion of gases flowing through the gas path 18 is directed from the aft end 32 of the fan track liner 22 radially outward outside of the annular case 20, axially forward toward the forward end 30 of the fan track liner 22, and radially inward back into the gas path 18 axially forward of the forward end 30 of the fan track liner 22.

Figure 4:
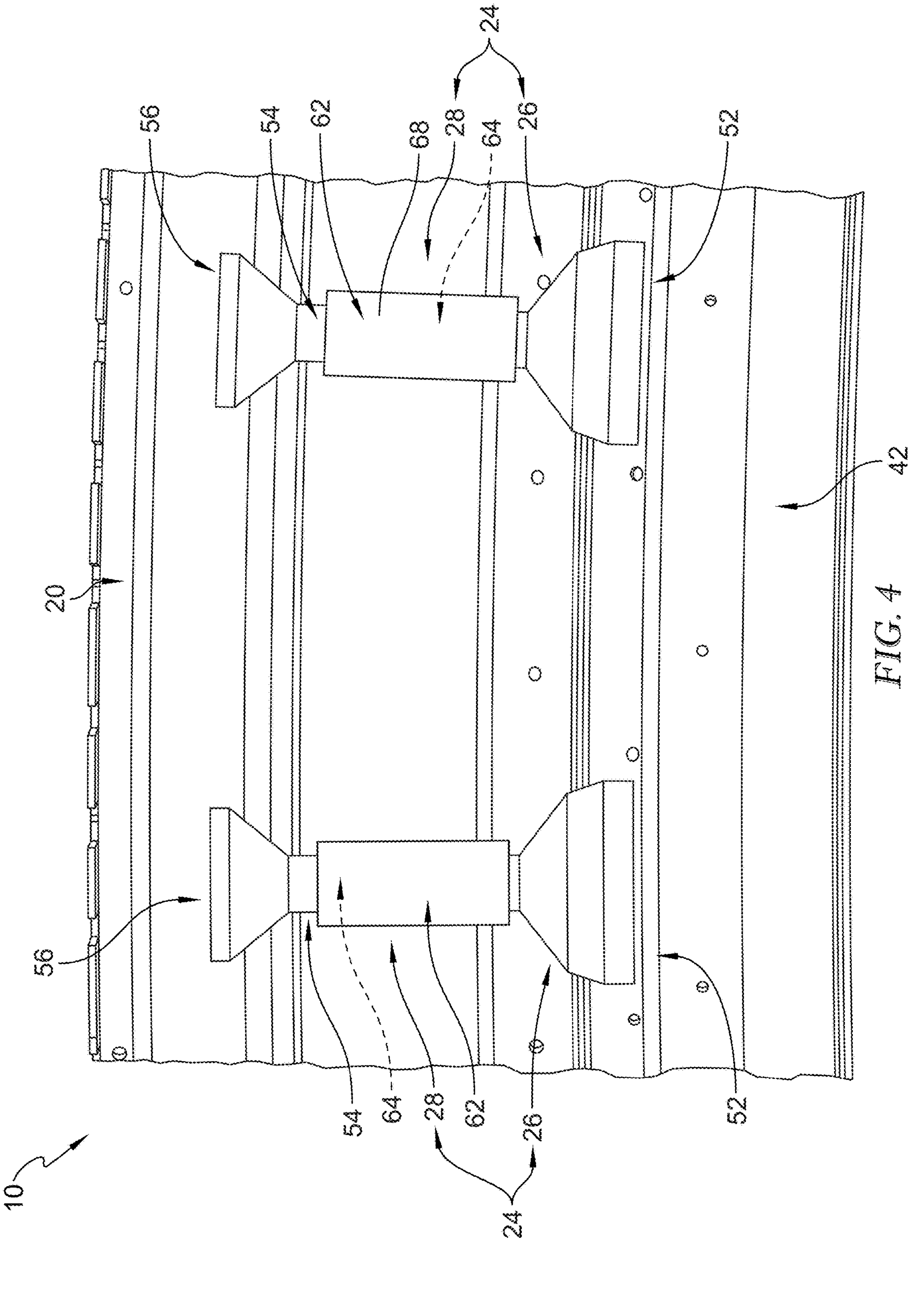
FIG. 4 is an elevation view of the fan case assembly of FIG. 3 looking radially inward from radially outward of the fan case assembly showing that the conduit of the air recirculation duct and the thermal conditioner are located radially outward of the outer wall of the annular case.

In the illustrative embodiment, the conduit 54 solely extends axially between the extraction and injection ports 52, 56, as shown in FIG. 4. In some embodiments, the conduit 54 may extend axially and circumferentially between the extraction and injection ports 52, 56. In FIG. 4, the tip injection system 24 is shown from radially outward of the annular case 20 looking radially inward. In the illustrative embodiment, the extraction port 52 is circumferentially aligned with the injection port 56 so that the conduit 54 extends in the axial direction relative to the axis 11 of the gas turbine engine 110.

In the illustrative embodiment, the injection port 56 extends through the outer wall 42 of the annular case 20 axially forward of the forward flange 44B of the hook 44, and the extraction port 52 extends through the outer wall 42 axially aft of the flange 46, as shown in FIGS. 2 and 3. The conduit 54 is located radially outward of the flange 46 of the annular case 20.

The conduit 54 extends between a forward end 58 and an aft end 60, as shown in FIG. 3. The extraction port 52 extends radially inward and axially forward from the aft end 60 of the conduit 54 such that the aft end 60 forms a bend or curve. The injection port 56 extends radially inward and axially aft from the forward end 58 of the conduit 54 such that the forward end 58 forms a bend or curve.

The thermal conditioner 28 of the tip injection system 24 is in thermal communication with the conduit 54 of the air recirculation duct 26, as shown in FIGS. 3 and 4. The thermal conditioner 28 includes a reservoir 62 and phase change material 64. The reservoir 62 is arranged around the conduit 54. The phase change material 64 is located in the reservoir 62.

In some embodiments, the reservoir 62 extends entirely around the conduit 54, as suggested in FIGS. 1-4. The reservoir 62 is located radially outward of the outer wall 42 of the annular case 20. The reservoir 62 separates the phase change material 64 from the portion of the gases flowing through the conduit 54.

In some embodiments, as shown in FIG. 3, the reservoir 62 may be supported by a terminal end 46E of the flange 46. In some embodiments, the reservoir 62 extends entirely between the forward end 58 and the aft end 60 of the conduit 54. In some embodiments, the reservoir 62 extends along only a portion of the conduit 54 between the forward end 58 and the aft end 60.

The reservoir 62 seals the phase change material 64 therein. In this way, the reservoir 62 does not receive new or unused phase change material 64 during use. Instead, the phase change material 64 remains within the reservoir 62 and is not cycled in and out of the reservoir 62.

The portion of gases flowing through the conduit 54 is in thermal communication with the reservoir 62 and the phase change material 64 therein. The phase change material 64 extracts the heat from the portion of gases being conducted through the conduit 54 to cool the portion of gases. As the phase change material 64 extracts the heat, the phase change material 64 changes from a first state to a second state different than the first state. In illustrative embodiments, the first state is solid, and the second state is liquid. Thus, as the phase change material 64 extracts the heat from the portion of gases, the phase change material 64 changes from a solid state to a liquid state. Because the phase change material 64 extracts the heat, the heat is stored in the phase change material 64.

In illustrative embodiments, the phase change material 64 is configured to change from the first state to the second state at a threshold temperature. The material selection of the phase change material 64 allows for control of the temperature at which the phase change material 64 changes from the first state to the second state. The threshold temperature may also be referred to as a melting point of the phase change material 64.

In some embodiments, the threshold temperature is a temperature of the gases flowing through the gas path 18 at the aft end of the fan 112 (i.e., at the aft end 32 of the fan track liner 22). In this way, the phase change material 64 extracts the heat from the portion of gases taken from the aft end 32 of the fan track liner 22.

In some embodiments, the threshold temperature is about 100 degrees Fahrenheit to about 250 degrees Fahrenheit. In some embodiments, the threshold temperature is about 100 degrees Fahrenheit. In some embodiments, the threshold temperature is about 150 degrees Fahrenheit. In some embodiments, the threshold temperature is about 200 degrees Fahrenheit. In some embodiments, the threshold temperature is about 250 degrees Fahrenheit.

In some embodiments, the phase change material 64 comprises paraffin wax. The paraffin wax may be low melting point wax, high melting point wax, or any other suitable paraffin wax. Low melting point wax has a melting point of about 135 degrees Fahrenheit. In other words, the threshold temperature for the low melting point wax is about 135 degrees Fahrenheit. High melting point wax has a melting point of about 165 degrees Fahrenheit.

In some embodiments, the phase change material 64 comprises sugar alcohols. The sugar alcohols may comprise xylitol, sorbitol, erythritol, or any other suitable sugar alcohol. Xylitol has a melting point of about 200 degrees Fahrenheit. Sorbitol has a melting point of about 200 degrees Fahrenheit. Erythritol has a melting point of about 245 degrees Fahrenheit.

In some embodiments, the phase change material 64 comprises plastic. The plastic may be polyethylene or any other suitable plastic. Ultra-high molecular weight polyethylene has a melting point of about 275 degrees Fahrenheit. High density polyethylene has a melting point of about 250 degrees Fahrenheit. Medium density polyethylene has a melting point of about 250 degrees Fahrenheit. Low density polyethylene has a melting point of about 240 degrees Fahrenheit.

The tip injection system 24 may be used in other embodiments of multi-stage fans or supersonic turbofans not shown herein. The present disclosure is not limited to single-stage fans as depicted.

As shown in FIG. 3, an outer surface 66 of the conduit 54 interfaces with the reservoir 62. In some embodiments, at least a portion of the outer surface 66 of the conduit 54 comprises high thermal conductivity composites. In some embodiments, an entirety of the outer surface 66 of the conduit 54 comprises high thermal conductivity composites. The high thermal conductivity composites allow for the heat to be transmitted from the portion of gases, through the outer surface 66 of the conduit 54, and to the phase change material 64.

In some embodiments, the high thermal conductivity composites comprise pitch-based carbon fiber. Pitch-based carbon fiber, in fabric form, has a thermal conductivity of about 500 W/mk. Pitch-based carbon fiber, in chopped form, has a thermal conductivity of about 900 W/mk. Pitch-based carbon fiber allows for greater thermal conductivity between the portion of gases and the phase change material 64. For the fabric form of pitch-based carbon fiber, the fibers may be oriented to improve heat transfer, such as in the direction of air flow.

In some embodiments, the high thermal conductivity composites further comprise a resin. For example, the pitch-based carbon fibers may be embedded in resin matrices to form carbon fiber-reinforced, high thermal conductivity composites. In some embodiments, the resin comprises epoxy, bismaleimide, benzoxazine, cyanate ester, polyimide, thermoplastics, or any other suitable resin. The resin may be selected based on the threshold temperature.

As shown in FIG. 3, the reservoir 62 defines a radial outer wall 68 that faces away from the outer surface 66 of the conduit 54. In some embodiments, the radial outer wall 68 of the reservoir 62 comprises low thermal conductivity composites. The low thermal conductivity composites minimize heat transfer out of the phase change material 64 through the radial outer wall 68. In this way, the heat is stored in the phase change material 64.

In some embodiments, the low thermal conductivity composites comprise polyacrylonitrile (PAN)-based carbon fiber. PAN-based carbon fiber has a thermal conductivity of about 0.5 W/mk to about 20 W/mK. As compared to pitch-based carbon fiber, PAN-based carbon fiber minimizes thermal conductivity between the phase change material 64 and areas surrounding the reservoir 62. The PAN-based carbon fiber, thus, maintains the heat within the phase change material 64.

In the illustrative embodiment, the fan case assembly 10 includes a plurality of tip injection systems 24, as shown in FIGS. 1 and 4. The plurality of tip injection systems 24 is spaced apart circumferentially about the axis 11. The number of tip injection systems 24 may depend on the size of the gas turbine engine 110 or on the stall margin improvement the gas turbine engine 110 may use. If the gas turbine engine 110 has desire for a greater stall margin improvement, the number of tip injection systems 24 may be increased and vice versa.

In some embodiments, the tip injection system 24 may further include a valve 70, as shown in FIG. 3. The valve 70 may be coupled to the extraction port 52 adjacent an opening 72 thereof that opens toward the gas path 18. The valve 70 may be configured to vary a flow of the portion of gases through the extraction port 52.

The valve 70 may be any suitable type of valve, such as, but not limited to, a butterfly valve, a gate valve, a globe valve, a ball valve, or any other suitable valve. The valve 70 is configured to change between a closed position (represented as solid lines in FIG. 3) and an open position (represented as dashed lines in FIG. 3) to control the flow of the portion of gases directed out of the gas path 18 into the air recirculation duct 26. In the closed position, the valve 70 extends axially across the extraction port 52 to block the opening 72 of the extraction port 52 and prevent the flow of the portion of gases through the extraction port 52. In the open position, the valve 70 moves and/or rotates so as to allow the flow of the portion of gases through the extraction port 52.

While the valve 70 is in the open position, the portion of gases is directed through the extraction port 52 and into the conduit 54. As the portion of gases flow through the conduit 54, the phase change material 64 extracts the heat from the portion of gases thereby cooling the portion of gases. As the phase change material 64 extracts the heat, the phase change material 64 changes from the first state to the second state. The relatively cooler portion of gases is directed back into the gas path 18 via the injection port 56 to improve stall margin. Because the portion of gases is cooled in the conduit 54, the portion of gases minimizes any thermal distortion at the forward end 30 of the fan track liner 22 that may otherwise be induced.

In response to the stall margin improvement no longer being desired, the valve 70 is moved to the closed position. While the valve 70 is in the closed position, the portion of gases is not directed through the extraction port 52 as the opening 72 is blocked by the valve 70. While the portion of gases is not flowing through the conduit 54, the phase change material 64 is not subjected to the heat of the portion of gases. In this way, the heat stored in the phase change material 64 may dissipate such that the phase change material 64 can change from the second state to the first state (i.e., the phase change material 64 can re-solidify). The phase change material 64 will then be ready to extract additional heat in response to the valve 70 being moved to the open position.

In some embodiments, the tip injection system 24 further includes a control system 74, as shown in FIG. 3. The control system 74 selectively moves the valve 70 between the closed and open positions. The control system 74 may operate in different modes depending on an operating condition of the gas turbine engine 110, maneuvers of an aircraft having the gas turbine engine 110, sensor input, and combinations of the same.

The control system 74 includes a power supply 78, a plurality of sensors 76, a controller 80 including a processor, and a memory 82, as shown in FIG. 3. The control system 74 may comprise multiple processors and/or multiple memories 82. The power supply 78 is coupled to the valve 70 to provide power to the valve 70. The controller 80 is coupled to the valve 70 and the power supply 78 to control operation of the valve 70 and the power supply 78. The controller 80 is also coupled to the plurality of sensors 76 to receive inputs from the plurality of sensors 76.

In some embodiments, the control system 74 operates the valve 70 based on an operating condition of the gas turbine engine 110. The operating conditions may include at least one of take-off, climb, cruise, descent, and landing of an aircraft having the gas turbine engine 110. The control system 74 may also operate the valve 70 based on a maneuver of an aircraft having the gas turbine engine 110, such as, but not limited to, banks, turns, or rolls. In each of these operating conditions and/or maneuvers, a greater stall margin improvement may be useful to the gas turbine engine 110. For example, maximum thrust may be used at take-off and more stall margin may be used during maneuvers. In straight and level cruise, adequate thrust margin and adequate stall margin may be achieved. The control system 74 may be optimized to move the valve to the closed position while thrust or stall margin are not limiting. The valve 70 may be moved to the open position for tip injection during maneuvers.

As previously described, the fan case assembly 10 includes the plurality of tip injection systems 24, as shown in FIGS. 1 and 4. The control system 74 may selectively operate each of the tip injection systems 24 together or may operate each of the tip injection systems 24 individually.

In some embodiments, the control system 74 operates the valve 70 depending on sensor input from the at least one sensor 76 included in the control system 74. The at least one sensor 76 is configured to measure one of temperature, pressure, air speed, altitude, blade tip timing, blade rotational speed, attitude or aircraft orientation, and acceleration. The at least one sensor 76 is configured to detect distortion, fan stall, and/or other aeromechanical issues. The control system 74 receives a measurement from the plurality of sensors 76 and directs the valve 70 to move to the open or closed positions in response to the measurement.

For example, the control system 74 may be configured to direct the valve 70 to move to the closed position in response to the measurements from the at least one sensor 76 being within a predetermined threshold and, thus, not indicative of any useful stall margin improvement. Then, in response to the measurements from the at least one sensor 76 being outside of the predetermined threshold, the control system 74 directs the valve 70 to move to the open position to direct the portion of gases into the gas path 18 forward of the forward end 30 of the fan track liner 22 for tip injection and stall margin improvement. In some embodiments, the control system 74 is configured to use the measurements from the plurality of sensors 76 to anticipate aircraft maneuvers.

The plurality of sensors 76 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the at least one sensor 76 may be a dynamic pressure transducer. The at least one sensor 76 may include a sensor configured to measure a rotational speed of the fan blades 14, which could be used along with an additional sensor that is a dynamic pressure transducer. In some embodiments, the at least one sensor 76 may include a sensor configured to measure a rotation speed of another section of the gas turbine engine 110.

The control system 74 uses the operating condition of the gas turbine engine 110, maneuvers of the aircraft having the gas turbine engine 110, and/or sensor input to maintain optimal performance of the tip injection system 24. The tip injection system 24 is operated by the control system 74 to provide tip injection to extend stall capacity and to decrease thermal distortion.

Figure 5:
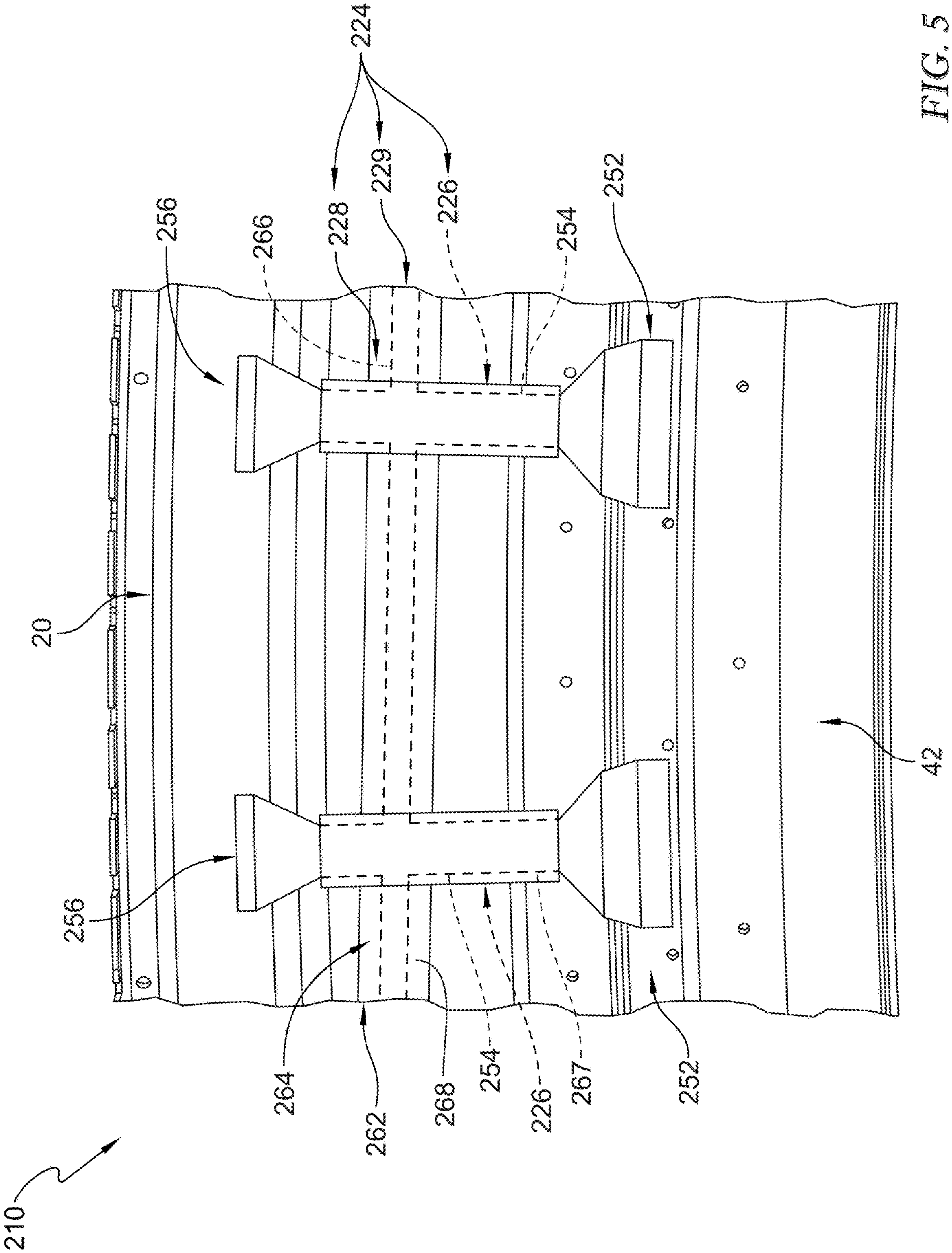
FIG. 5 is an elevation view of another embodiment of a tip injection system for the gas turbine engine of FIG. 1 looking radially inward from radially outward of the fan case assembly showing that a manifold extends between adjacent conduits of air recirculation ducts and the manifold extends through a thermal conditioner.

Another embodiment of a fan case assembly 210 in accordance with the present disclosure is shown in FIG. 5. The fan case assembly 210 is substantially similar to the fan case assembly 10 shown in FIGS. 1-4 and described herein. Accordingly, similar reference numbers in the 200 series indicate features that are common between the fan case assembly 210 and the fan case assembly 10. The description of the fan case assembly 10 is incorporated by reference to apply to the fan case assembly 210, except in instances when it conflicts with the specific description and the drawings of the fan case assembly 210.

As compared to the fan case assembly 10, the fan case assembly 210 includes a different tip injection system 224, as shown in FIG. 5. The tip injection system 224 includes an air recirculation duct 226 and a thermal conditioner 228. The air recirculation duct 226 is configured to direct the portion of gases flowing through the gas path 18 from the aft end 32 of the fan track liner 22 into the gas path 18 axially forward of the forward end 30 of the fan track liner 22. The thermal conditioner 228 is in thermal communication with the air recirculation duct 226 to extract the heat from the portion of gases flowing through the air recirculation duct 226.

In the illustrative embodiment, the fan case assembly 210 includes a plurality of air recirculation ducts 226, as shown in FIG. 5. The plurality of air recirculation ducts 226 is spaced apart circumferentially about the axis 11. The description of one air recirculation duct 226 applies with equal weight to other air recirculation ducts 226.

The air recirculation duct 226 of the tip injection system 224 includes an extraction port 252, a conduit 254, and an injection port 256, as shown in FIG. 5. Both the extraction port 252 and the injection port 256 are in fluid communication with the gas path 18 of the gas turbine engine 110, while the conduit 254 is in fluid communication with the extraction and injection ports 252, 256.

The extraction port 252 extends radially through the outer wall 42 of the annular case 20 at a location axially aft of the aft end 32 of the fan track liner 22. The conduit 254 extends axially forward from the extraction port 252 toward the forward end 30 of the fan track liner 22 to the injection port 256, as shown in FIG. 5. The injection port 256 extends radially inward from the conduit 254 through the outer wall 42 of the annular case 20 at a location axially forward of the forward end 30 of the fan track liner 22.

The conduit 254 is located radially outward of the outer wall 42 of the annular case 20, as shown in FIG. 5. The extraction port 252 and the injection port 256 extend radially inward through the outer wall 42 of the annular case 20 and open into the gas path 18. In this way, the portion of gases flowing through the gas path 18 is directed from the aft end 32 of the fan track liner 22 radially outward outside of the annular case 20, axially forward toward the forward end 30 of the fan track liner 22, and radially inward back into the gas path 18 axially forward of the forward end 30 of the fan track liner 22.

The tip injection system 224 further includes a manifold 229, as shown in FIG. 5. The manifold 229 is located radially outward of the outer wall 42 of the annular case 20. The manifold 229 extends between the conduits 254 of adjacent air recirculation ducts 226 to put the conduits 254 in fluid communication with one another. In this way, the portion of gases directed out of the gas path 18 by one of the extraction ports 252 may flow to any of the injection ports 256.

In some embodiments, the manifold 229 extends entirely circumferentially about the axis 11 between adjacent conduits 254. In some embodiments, the manifold 229 extends at least circumferentially partway about the axis 11 between adjacent conduits 254.

The thermal conditioner 228 of the tip injection system 224 is in thermal communication with the manifold 229 and the conduits 254 of the air recirculation duct 226, as shown in FIG. 5. The thermal conditioner 228 includes a reservoir 262 and phase change material 264. The reservoir 262 is arranged around the manifold 229 and the conduits 254. The phase change material 264 is located in the reservoir 262.

In some embodiments, the reservoir 262 extends entirely around the manifold 229 and entirely around the conduits 254, as suggested in FIG. 5. The reservoir 262 is located radially outward of the outer wall 42 of the annular case 20. The reservoir 262 separates the phase change material 264 from the portion of the gases flowing through the conduit 254 and the manifold 229.

In some embodiments, the reservoir 262 extends entirely circumferentially about the axis 11. In some embodiments, the reservoir 262 extends at least circumferentially partway about the axis 11.

The portion of gases flowing through the manifold 229 and the conduits 254 is in thermal communication with the reservoir 262 and the phase change material 264 therein. The phase change material 264 extracts the heat from the portion of gases being conducted through the manifold 229 and the conduits 254 to cool the portion of gases.

As the phase change material 264 extracts the heat, the phase change material 264 changes from a first state to a second state different than the first state. Because the phase change material 64 extracts the heat, the heat is stored in the phase change material 264.

As shown in FIG. 5, an outer surface 266 of the manifold 229 interfaces with the reservoir 262. In some embodiments, at least a portion of the outer surface 266 of the manifold 229 comprises high thermal conductivity composites. In some embodiments, an entirety of the outer surface 266 of the manifold 229 comprises high thermal conductivity composites. The high thermal conductivity composites allow for the heat to be transmitted from the portion of gases, through the outer surface 266 of the manifold 229, and to the phase change material 264. In some embodiments, the high thermal conductivity composites comprise pitch-based carbon fiber.

An outer surface 267 of the conduits 254 interfaces with the reservoir 262. In some embodiments, at least a portion of the outer surface 267 of the conduits 254 comprises high thermal conductivity composites. In some embodiments, an entirety of the outer surface 267 of the conduits 254 comprises high thermal conductivity composites. The high thermal conductivity composites allow for the heat to be transmitted from the portion of gases, through the outer surface 267 of the conduits 254, and to the phase change material 264. In some embodiments, the high thermal conductivity composites comprise pitch-based carbon fiber.

As shown in FIG. 5, the reservoir 262 defines a radial outer wall 268 that faces away from the outer surface 267 of the conduit 254 and the outer surface 266 of the manifold 229. In some embodiments, the radial outer wall 268 of the reservoir 262 comprises low thermal conductivity composites. The low thermal conductivity composites minimize heat transfer out of the phase change material 264 through the radial outer wall 268. In some embodiments, the low thermal conductivity composites comprise polyacrylonitrile (PAN)-based carbon fiber.

Figure 6:
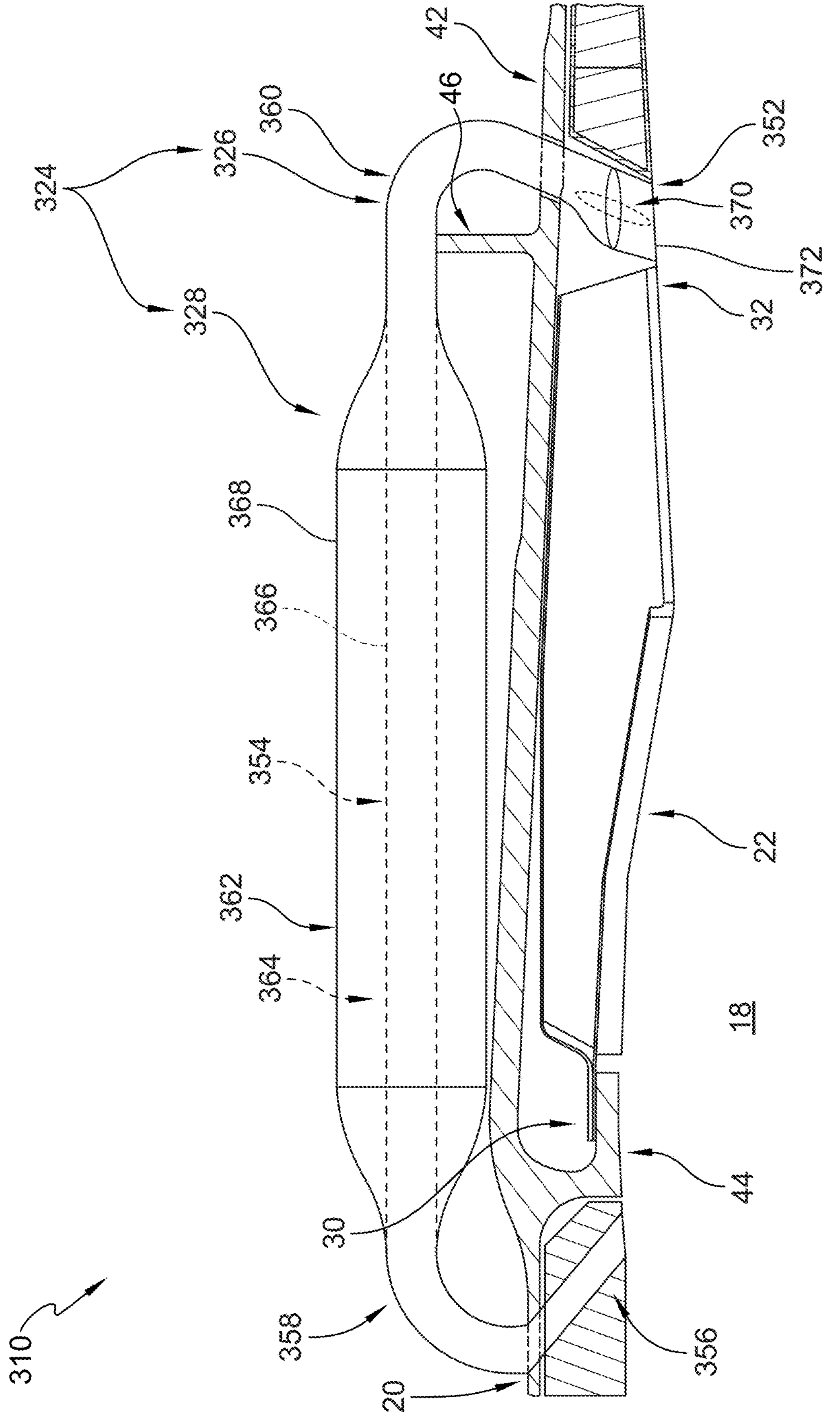
FIG. 6 is another embodiment of a tip injection system for the gas turbine engine of FIG. 1 showing that a thermal conditioner of the tip injection system has a varying diameter.

Another embodiment of a fan case assembly 310 in accordance with the present disclosure is shown in FIG. 6. The fan case assembly 310 is substantially similar to the fan case assembly 10 shown in FIGS. 1-4 and described herein and the fan case assembly 210 shown in FIG. 5 and described herein. Accordingly, similar reference numbers in the 300 series indicate features that are common between the fan case assembly 310 and the fan case assembly 10. The description of the fan case assembly 10 is incorporated by reference to apply to the fan case assembly 310, except in instances when it conflicts with the specific description and the drawings of the fan case assembly 310.

As compared to the fan case assembly 10, 210, the fan case assembly 310 includes a different tip injection system 324, as shown in FIG. 6. The tip injection system 324 includes an air recirculation duct 326 and a thermal conditioner 328. The air recirculation duct 326 is configured to direct the portion of gases flowing through the gas path 18 from the aft end 32 of the fan track liner 22 into the gas path 18 axially forward of the forward end 30 of the fan track liner 22. The thermal conditioner 328 is in thermal communication with the air recirculation duct 326 to extract the heat from the portion of gases flowing through the air recirculation duct 326.

The air recirculation duct 326 of the tip injection system 324 includes an extraction port 352, a conduit 354, and an injection port 356, as shown in FIG. 6. Both the extraction port 352 and the injection port 356 are in fluid communication with the gas path 18 of the gas turbine engine 110, while the conduit 354 is in fluid communication with the extraction and injection ports 352, 356.

The extraction port 352 extends radially through the outer wall 42 of the annular case 20 at a location axially aft of the aft end 32 of the fan track liner 22, as shown in FIG. 6. The conduit 354 extends axially forward from the extraction port 352 toward the forward end 30 of the fan track liner 22 to the injection port 356. The injection port 356 extends radially inward from the conduit 354 through the outer wall 42 of the annular case 20 at a location axially forward of the forward end 30 of the fan track liner 22.

The conduit 354 is located radially outward of the outer wall 42 of the annular case 20, as shown in FIG. 6. The extraction port 352 and the injection port 356 extend radially inward through the outer wall 42 of the annular case 20 and open into the gas path 18. In this way, the portion of gases flowing through the gas path 18 is directed from the aft end 32 of the fan track liner 22 radially outward outside of the annular case 20, axially forward toward the forward end 30 of the fan track liner 22, and radially inward back into the gas path 18 axially forward of the forward end 30 of the fan track liner 22.

In the illustrative embodiment, the injection port 356 extends through the outer wall 42 of the annular case 20 axially forward of the hook 44, and the extraction port 352 extends through the outer wall 42 axially aft of the flange 46, as shown in FIG. 6. The conduit 354 is located radially outward of the flange 46 of the annular case 20.

The conduit 354 extends between a forward end 358 and an aft end 360, as shown in FIG. 6. The extraction port 352 extends radially inward and axially forward from the aft end 360 of the conduit 354 such that the aft end 360 forms a bend or curve. The injection port 356 extends radially inward and axially aft from the forward end 358 of the conduit 354 such that the forward end 358 forms a bend or curve.

The thermal conditioner 328 of the tip injection system 324 is in thermal communication with the conduit 354 of the air recirculation duct 326, as shown in FIG. 6. The thermal conditioner 328 includes a reservoir 362 and phase change material 364. The reservoir 362 is arranged around the conduit 354. The phase change material 364 is located in the reservoir 362.

In some embodiments, the reservoir 362 extends entirely around the conduit 354, as suggested in FIG. 6. The reservoir 362 is located radially outward of the outer wall 42 of the annular case 20. In some embodiments, the reservoir 362 extends entirely between the forward end 358 and the aft end 360 of the conduit 354. In some embodiments, the reservoir 362 extends along only a portion of the conduit 354 between the forward end 358 and the aft end 360. The reservoir 362 has a varying diameter, and the conduit 354 has a substantially constant diameter, as shown in FIG. 6.

As shown in FIG. 6, an outer surface 366 of the conduit 354 interfaces with the phase change material 364 in the reservoir 362. In some embodiments, at least a portion of the outer surface 366 of the conduit 354 comprises high thermal conductivity composites. In some embodiments, an entirety of the outer surface 366 of the conduit 354 comprises high thermal conductivity composites. The high thermal conductivity composites allow for the heat to be transmitted from the portion of gases, through the outer surface 366 of the conduit 354, and to the phase change material 364.

As shown in FIG. 6, the reservoir 362 defines a radial outer wall 368 that faces away from the outer surface 366 of the conduit 354. In some embodiments, the radial outer wall 368 of the reservoir 362 comprises low thermal conductivity composites. The low thermal conductivity composites minimize heat transfer out of the phase change material 364 through the radial outer wall 368.

In some embodiments, the reservoir 362 and the conduit 354 are formed via roll wrapping the conduit 354 and then placing the conduit 354 in a mold tool to form the reservoir 362 around the conduit 354.

In some embodiments, the tip injection system 324 may further include a valve 370, as shown in FIG. 6. The valve 370 may be coupled to the extraction port 352 adjacent an opening 372 thereof that opens toward the gas path 18. The valve 370 may be configured to vary a flow of the portion of gases through the extraction port 352.

Figure 7:
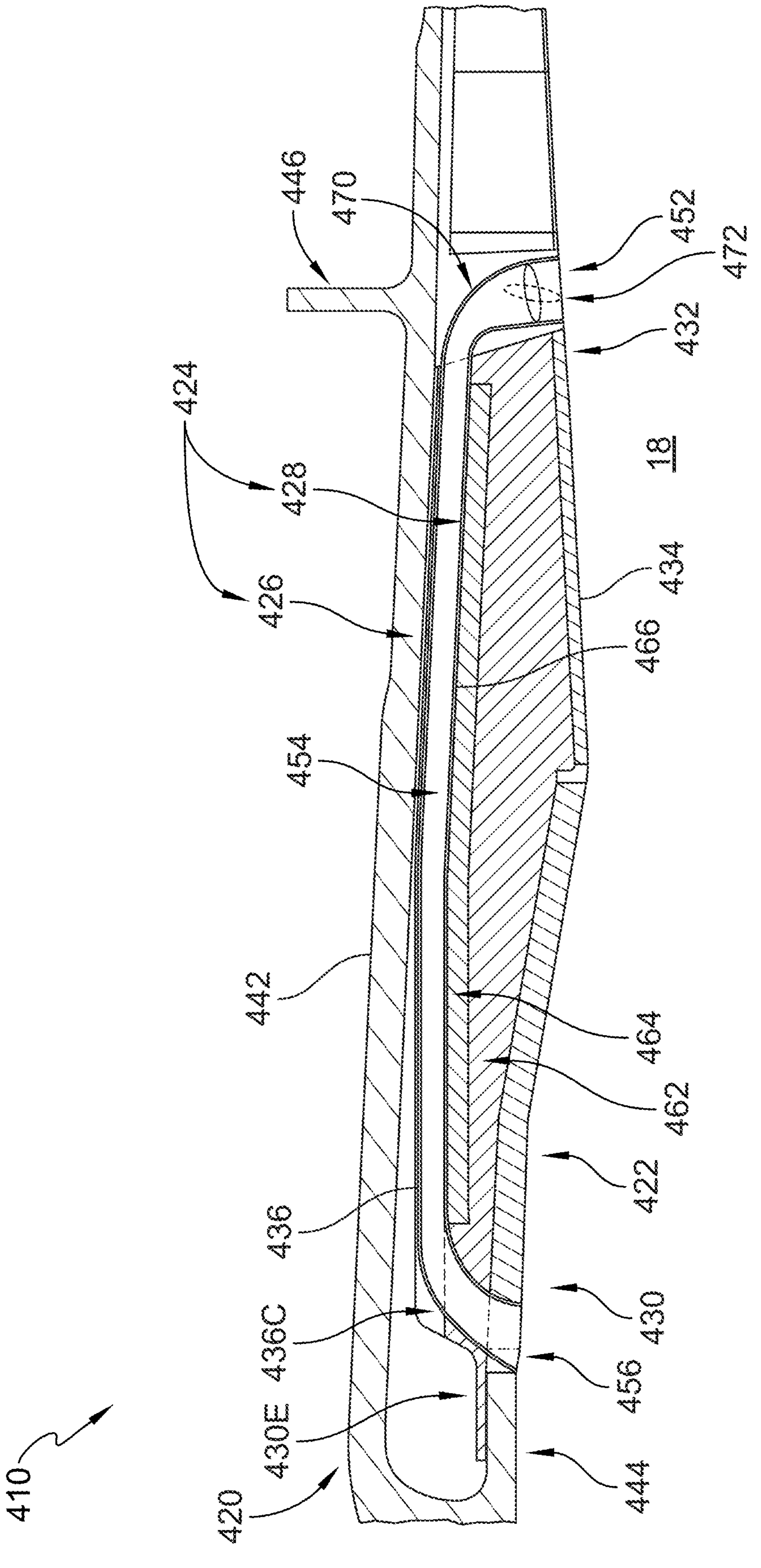
FIG. 7 is another embodiment of a fan case assembly for the gas turbine engine of FIG. 1 showing the fan case assembly includes an annular case, a fan track liner coupled to the annular case, and a tip injection system located radially inward of the annular case.

Another embodiment of a fan case assembly 410 in accordance with the present disclosure is shown in FIG. 7. The fan case assembly 410 is substantially similar to the fan case assembly 10, 210, 310. Accordingly, similar reference numbers in the 400 series indicate features that are common between the fan case assembly 410 and the fan case assembly 10, 210, 310. The description of the fan case assembly 10, 210, 310 is incorporated by reference to apply to the fan case assembly 410, except in instances when it conflicts with the specific description and the drawings of the fan case assembly 310.

The fan case assembly 410 includes, among other components, an annular case 420, a fan track liner 422, and a tip injection system 424, as shown in FIG. 7. The annular case 420 is configured to support the fan track liner 422 at a radial position relative to the axis 11 of the gas turbine engine 110. The fan track liner 422 extends circumferentially at least partway about the axis 11 of the gas turbine engine 110 and defines a portion of the gas path 18 of the gas turbine engine 110. The tip injection system 424 is configured to direct a portion of gases flowing through the gas path 18 of the gas turbine engine 110 from an aft end 432 of the fan track liner 422 into the gas path 18 axially forward of a forward end 430 of the fan track liner 422. The tip injection system 424 is also configured to extract heat from the portion of gases before the portion of gases is injected into the gas path 18 axially forward of the forward end 430 of the fan track liner 422.

The tip injection system 424 includes an air recirculation duct 426 and a thermal conditioner 428, as shown in FIG. 7. The air recirculation duct 426 is configured to direct the portion of gases flowing through the gas path 18 from the aft end 432 of the fan track liner 422 into the gas path 18 axially forward of the forward end 430 of the fan track liner 422. The thermal conditioner 428 is in thermal communication with the air recirculation duct 426 to extract the heat from the portion of gases flowing through the air recirculation duct 426.

Turning again to the fan track liner 422, in the illustrative embodiment, the fan track liner 422 is formed to include a channel 436C formed in an outer radial surface 436 of the fan track liner 422, as shown in FIG. 7. The air recirculation duct 426 is located in the channel 436C so that the air recirculation duct 426 is located radially inward of the annular case 420 and the outer radial surface 436 of the fan track liner 422. In this way, the air recirculation duct 426 is integrated into the fan track liner 422 and does not extend through the annular case 420.

The annular case 420 includes the outer wall 442, a hook 444, and a flange 446, as shown in FIG. 7. The outer wall 442 extends circumferentially around the axis 11 of the gas turbine engine 110. The hook 444 extends radially inward from the outer wall 442. The flange 446 extends radially outward from the outer wall 442 axially aft of the hook 444.

The air recirculation duct 426 includes an extraction port 452, a conduit 454, and an injection port 456, as shown in FIG. 7. Both the extraction port 452 and the injection port 456 are in fluid communication with the gas path 18 of the gas turbine engine 110, while the conduit 454 is in fluid communication with the extraction and injection ports 452, 456. The extraction port 452 extends radially outward from the gas path 18 at a location near the aft end 432 of the fan track liner 422. The conduit 454 extends axially forward from the extraction port 452 toward the forward end 430 of the fan track liner 422 to the injection port 456. The injection port 456 extends radially inward from the conduit 454 toward the gas path 18 at a location near the forward end 430 of the fan track liner 422.

The conduit 454 is located radially inward of the annular case 420 and radially outward of a radially-inwardly facing surface 434 of the fan track liner 422 which defines a portion of the gas path 18, as shown in FIG. 7. The extraction port 452 and the injection port 456 extend radially inward to open into the gas path 18. In this way, the portion of gases flowing through the gas path 18 is directed from the aft end 432 of the fan track liner 422 radially outward, axially forward toward the forward end 430 of the fan track liner 422, and radially inward back into the gas path 18 near the forward end 430 of the fan track liner 422. No portion of the air recirculation duct 426 extends through the annular case 420. The injection port 456 may extend through the fan track liner 422 so that the injection port 456 is spaced apart from a front edge 430E of the fan track liner 422, as shown in FIG. 7.

The thermal conditioner 428 of the tip injection system 424 is in thermal communication with the conduit 454 of the air recirculation duct 426, as shown in FIG. 7. The thermal conditioner 428 includes a reservoir 462 and phase change material 464. The reservoir 462 is arranged around the conduit 454. The phase change material 464 is located in the reservoir 462.

In some embodiments, the reservoir 462 is located radially inward of the conduit 454, the outer radial surface 436 of the fan track liner 422, and the annular case 420, as shown in FIG. 7. In some embodiments, the reservoir 462 is located radially outward of the conduit 454 and radially inward of the outer radial surface 436 of the fan track liner 422 and the annular case 420. In some embodiments, the reservoir 462 extends entirely around the conduit 454.

The reservoir 462 seals the phase change material 464 therein. In this way, the reservoir 462 does not receive new or unused phase change material 64 during use. Instead, the phase change material 464 remains within the reservoir 462 and is not cycled in and out of the reservoir 462.

The portion of gases flowing through the conduit 454 is in thermal communication with the reservoir 462 and the phase change material 464 therein. The phase change material 464 extracts the heat from the portion of gases being conducted through the conduit 454 to cool the portion of gases. As the phase change material 464 extracts the heat, the phase change material 464 changes from a first state to a second state different than the first state.

As shown in FIG. 7, an outer surface 466 of the conduit 454 interfaces with the reservoir 462. In some embodiments, at least a portion of the outer surface 466 of the conduit 454 comprises high thermal conductivity composites. In some embodiments, an entirety of the outer surface 466 of the conduit 454 comprises high thermal conductivity composites. The high thermal conductivity composites allow for the heat to be transmitted from the portion of gases, through the outer surface 466 of the conduit 454, and to the phase change material 464.

In some embodiments, the tip injection system 424 may further include a valve 470, as shown in FIG. 7. The valve 470 may be coupled to the extraction port 452 adjacent an opening 472 thereof that opens toward the gas path 18. The valve 470 may be configured to vary a flow of the portion of gases through the extraction port 452.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising a fan track liner that extends circumferentially at least partway about a central axis of the gas turbine engine, the fan track liner including a forward end, an aft end spaced apart axially from the forward end, and an inner radial surface that extends between the forward end and the aft end to define a gas path of the gas turbine engine, an annular case configured to support the fan track liner at a radial position relative to the central axis, the annular case including an outer wall that extends circumferentially around the central axis of the gas turbine engine, and a tip injection system including (a) an air recirculation duct configured to direct a portion of gases flowing through the gas path of the gas turbine engine from the aft end of the fan track liner into the gas path at the forward end of the fan track liner, the air recirculation duct having (i) an extraction port in fluid communication with the gas path at a location axially aft of the aft end of the fan track liner, (ii) a conduit that extends axially forward from the extraction port toward the forward end of the fan track liner, and (iii) an injection port that extends radially inward from the conduit at a location adjacent the forward end of the fan track liner, and (b) a thermal conditioner in thermal communication with the conduit of the air recirculation duct, the thermal conditioner including phase change material configured to extract heat from the portion of gases flowing through the conduit to change a state of the phase change material from a first state to a second state different than the first state and thereby cool the portion of gases and minimize thermal distortion induced by the portion of gases at the location adjacent the forward end of the fan track liner.

2. The fan case assembly of claim 1, wherein the thermal conditioner further includes a reservoir arranged around the conduit of the air recirculation duct and the phase change material is located in the reservoir.

3. The fan case assembly of claim 2, wherein at least a portion of the conduit of the air recirculation duct comprises pitch-based carbon fiber materials, and wherein a radial outer wall of the reservoir that faces away from the conduit comprises polyacrylonitrile (PAN)-based carbon fiber materials.

4. The fan case assembly of claim 1, wherein the annular case further includes a hook that extends radially inward from the outer wall to support the forward end of the fan track liner, and wherein the extraction port extends radially through the outer wall at the location axially aft of the aft end of the fan track liner and the injection port extends radially inward from the conduit through the outer wall at a location axially forward of the forward end of the fan track liner and the hook of the annular case.

5. The fan case assembly of claim 1, wherein the conduit and the phase change material are located radially outward of the outer wall.

6. The fan case assembly of claim 1, wherein the conduit and the phase change material are located radially inward of the outer wall.

7. The fan case assembly of claim 1, wherein the tip injection system further includes a valve coupled to the extraction port of the air recirculation duct and configured to vary a flow of the portion of gases through the extraction port and into the conduit.

8. The fan case assembly of claim 7, wherein the valve is configured to change between a closed position in which the valve blocks an opening of the extraction port to prevent the flow of the portion of gases through the extraction port and an open position in which the valve opens the opening of the extraction port to direct the portion of gases flowing through the gas path into the extraction port.

9. The fan case assembly of claim 8, wherein the tip injection system further comprises a controller in communication with the valve and configured to change the valve between the closed position and the open position.

10. A fan case assembly adapted for use with a gas turbine engine, the fan case assembly comprising a fan track liner that extends circumferentially at least partway about a central axis of the gas turbine engine, the fan track liner including a forward end, an aft end spaced apart axially from the forward end, and an inner radial surface that extends between the forward end and the aft end to define a gas path of the gas turbine engine, an annular case configured to support the fan track liner at a radial position relative to the central axis, and a tip injection system including an air recirculation duct that directs a portion of gases flowing through the gas path of the gas turbine engine from the aft end of the fan track liner into the gas path adjacent the forward end of the fan track liner and a thermal conditioner in thermal communication with the air recirculation duct, the thermal conditioner including phase change material configured to extract heat from the portion of gases flowing through the air recirculation duct to change a state of the phase change material from a first state to a second state different than the first state and thereby cool the portion of gases.

11. The fan case assembly of claim 10, wherein the air recirculation duct includes an extraction port in fluid communication with the gas path at a location axially aft of the aft end of the fan track liner, a conduit that extends axially forward from the extraction port toward the forward end of the fan track liner, and an injection port that extends radially inward from the conduit at a location axially forward of the forward end of the fan track liner.

12. The fan case assembly of claim 11, wherein the thermal conditioner further includes a reservoir arranged around the conduit of the air recirculation duct and the phase change material is located in the reservoir.

13. The fan case assembly of claim 12, wherein at least a portion of the conduit of the air recirculation duct comprises pitch-based carbon fiber materials, and wherein a radial outer wall of the reservoir that faces away from the conduit comprises polyacrylonitrile (PAN)-based carbon fiber materials.

14. The fan case assembly of claim 10, wherein the annular case includes an outer wall that extends circumferentially around the central axis of the gas turbine engine, and wherein the phase change material is located radially outward of the outer wall.

15. The fan case assembly of claim 10, wherein the annular case includes an outer wall that extends circumferentially around the central axis of the gas turbine engine, and wherein the phase change material is located radially inward of the outer wall.

16. The fan case assembly of claim 10, wherein the tip injection system further includes a valve coupled to the air recirculation duct and configured to vary a flow of the portion of gases through the air recirculation duct.

17. The fan case assembly of claim 16, wherein the tip injection system further comprises a controller in communication with the valve and configured to change the valve between a closed position in which the valve blocks an opening of the air recirculation duct to prevent a flow of the portion of gases through the air recirculation duct and an open position in which the valve opens the opening of the air recirculation duct to direct the portion of gases flowing through the gas path into the air recirculation duct.

18. A method comprising providing an annular case that extends around a central axis, a fan track liner that extends circumferentially at least partway around the central axis, and a tip injection system including an air recirculation duct and a thermal conditioner, coupling the fan track liner to the annular case, directing a portion of gases from an aft end of the fan track liner radially outwardly and axially forward into a conduit of the air recirculation duct, extracting heat from the portion of gases flowing through the conduit via phase change material of the thermal conditioner thereby cooling the portion of gases, and directing the portion of gases radially inwardly from the conduit at a forward end of the fan track liner.

19. The method of claim 18, wherein the annular case includes an outer wall, and wherein the conduit and the phase change material are located radially outward of the outer wall.

20. The method of claim 18, further comprising, before the step of directing a portion of gases from an aft end of the fan track liner radially outwardly and axially forward into a conduit, moving a valve from a closed position to an open position to open the air recirculation duct such that the portion of gases is free to flow into the air recirculation duct.

* * * * *